United States Patent
Li et al.

(10) Patent No.: US 12,436,652 B2
(45) Date of Patent: Oct. 7, 2025

(54) TOUCH SUBSTRATE, DISPLAY PANEL AND DISPLAY APPARATUS

(71) Applicant: BOE Technology Group Co., Ltd., Beijing (CN)

(72) Inventors: Yuanyuan Li, Beijing (CN); Zewen Bo, Beijing (CN); Meizhu Zheng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/272,569

(22) PCT Filed: Mar. 17, 2022

(86) PCT No.: PCT/CN2022/081397
§ 371 (c)(1),
(2) Date: Jul. 15, 2023

(87) PCT Pub. No.: WO2023/173353
PCT Pub. Date: Sep. 21, 2023

(65) Prior Publication Data
US 2025/0036242 A1    Jan. 30, 2025

(51) Int. Cl.
*G06F 3/041*    (2006.01)
*G06F 3/044*    (2006.01)

(52) U.S. Cl.
CPC .......... *G06F 3/0446* (2019.05); *G06F 3/0412* (2013.01); *G06F 2203/04111* (2013.01)

(58) Field of Classification Search
CPC ................. G06F 3/0446; G06F 3/0412; G06F 2203/04111
See application file for complete search history.

(56) References Cited

U.S. PATENT DOCUMENTS

| 2015/0193035 A1 | 7/2015 | Ullmann et al. | |
|---|---|---|---|
| 2017/0293381 A1* | 10/2017 | Lee | G06F 3/0443 |
| 2023/0092521 A1* | 3/2023 | Li | G06F 3/0412 345/173 |
| 2023/0214073 A1* | 7/2023 | Han | H10K 59/40 |

FOREIGN PATENT DOCUMENTS

| CN | 106997448 A | 8/2017 |
|---|---|---|
| CN | 215644496 U | 1/2022 |

OTHER PUBLICATIONS

PCT/CN2022/081397 international search report.
PCT/CN2022/081397 Written Opinion.

* cited by examiner

*Primary Examiner* — Deeprose Subedi
(74) *Attorney, Agent, or Firm* — IPro, PLLC (57) ABSTRACT

The present disclosure provides a touch substrate, a display panel and a display apparatus. The touch substrate includes: a touch insulating layer; a touch electrode, provided at a side of the touch insulating layer; and a first floating electrode, provided at a side of the touch insulating layer away from the touch electrode, where the first floating electrode and the touch electrode at least partially overlap in a thickness direction of the touch insulating layer. In the present disclosure, a signal-to-noise ratio can be improved.

16 Claims, 6 Drawing Sheets

TOUCH SUBSTRATE, DISPLAY PANEL AND DISPLAY APPARATUS

CROSS-REFERENCE TO RELATED APPLICATIONS

This application is a national stage of international PCT Application No. PCT/CN2022/081397 filed on Mar. 17, 2022, the entire contents of which are incorporated herein by reference.

TECHNICAL FIELD

The present disclosure relates to a technical field of displaying, and in particular, to a touch substrate, a display panel and a display apparatus.

BACKGROUND

Touch technology mainly includes resistive, capacitive and infrared optical touch technologies. The capacitive touch technology has a characteristic of sensitive response and is widely used in smart phones and tablet computers. A touch substrate using capacitive touch technology is provided with a touch electrode, a touch lead and a touch chip. The touch lead is electrically connected between the touch electrode and the touch chip, so as to transmit signals. However, existing touch substrates have poor signal-to-noise ratio.

SUMMARY

The purpose of the present disclosure is to provide a touch substrate, a display panel and a display apparatus, which are capable of improving signal-to-noise ratio.

According to an aspect of the present disclosure, a touch substrate is provided, where the touch substrate includes:
 a touch insulating layer;
 a touch electrode at a side of the touch insulating layer;
 a first floating electrode at a side of the touch insulating layer away from the touch electrode, where the first floating electrode and the touch electrode at least partially overlap in a thickness direction of the touch insulating layer.

Further, the first floating electrode includes electrode regions arranged in an insulating manner.

Further, the touch electrode includes a first electrode strip and a second electrode strip arranged in a cross manner, and the touch substrate further includes:
 a bridging electrode at a side of the touch insulating layer away from the touch electrode, where one of the first electrode strip and the second electrode strip is connected to the bridging electrode, and the bridging electrode and the first floating electrode are provided in a same layer.

Further, the first floating electrode has a grid shape, the first floating electrode includes a first grid hole, and the bridging electrode is located in the first grid hole.

Further, the first floating electrode has a grid shape.

Further, the touch electrode includes a first electrode strip and a second electrode strip arranged in a cross manner, the first electrode strip extends along a first direction, the second electrode strip extends along a second direction, and the first direction and the second direction are different.

first protrusions spaced are provided in a width direction of the first electrode strip, and a first concave part is formed between every two adjacent first protrusions of the first protrusions: an extension part is arranged in a width direction of the second electrode strip, and the extension part extends along the first direction, and second protrusions are provided in a width direction of the extension part, and the second protrusions extend into the first concave parts respectively.

Further, extension parts spaced are provided at a side of the width direction of the second electrode strip: for two adjacent extension parts of the extension parts, a side of one of the two adjacent extension parts close to a side of another of the two adjacent extension parts is provided with a second protrusion; and the touch substrate further includes:
 a bridging electrode at a side of the touch insulating layer away from the touch electrode: the second protrusion of the two adjacent extension parts is connected through the bridging electrode.

Further, in the second direction, the second electrode strip includes electrode segments spaced:
 the bridging electrode includes bridging regions spaced, the second protrusion of the two adjacent extension parts are connected through one of the bridging regions, and two adjacent electrode segments of the electrode segments are connected through another of the bridging regions.

Further, the touch electrode has a grid shape, a width of the first electrode strip, a width of the second electrode strip, a width of the first protrusion, a width of the extension part or a width of the second protrusion is equal to a width of 1-10 grids.

Further, the touch substrate further includes a buffer layer and a touch protective layer, where the buffer layer is located at a side of the touch insulating layer away from the touch electrode, and the first floating electrode is located between the buffer layer and the touch insulating layer; and the touch protective layer covers the touch insulating layer and the touch electrode.

Further, the touch electrode has a grid shape, the touch electrode is provided with a second grid hole, and the touch substrate further includes:
 a second floating electrode at a side of the touch insulating layer away from the first floating electrode, and located in the second grid hole.

Further, the touch electrode has a grid shape, the first electrode strip and/or the first protrusion comprises a second grid hole, and the touch substrate further includes:
 a second floating electrode at a side of the touch insulating layer away from the first floating electrode and located in the second grid hole.

Further, the touch electrode has a grid shape, and at least one of the second electrode strip, the extension part or the second protrusion is/are provided with a second grid hole, and the touch substrate further includes:
 a second floating electrode at a side of the touch insulating layer away from the first floating electrode and located in the second grid hole.

Further, the second floating electrode has a grid shape.

According to an aspect of the present disclosure, a display panel is provided, where the display panel includes:
 the touch substrate;
 a display substrate, including a substrate and a light emitter, where the light emitter is provided on the substrate, and the touch substrate is provided at a side of the light emitter away from the substrate.

Further, the light emitter includes a first electrode and a second electrode provided oppositely, and a light-emitting layer located between the first electrode and the second electrode: the display substrate further includes an encapsulation layer, where the encapsulation layer is provided at a side of the light emitter away from the substrate, and the touch structure is provided at a surface of the encapsulation layer away from the substrate.

According to an aspect of the present disclosure, a display apparatus is provided, where the display apparatus includes the display panel.

According to the touch substrate, the display panel and the display apparatus of the present disclosure, during use, the touch substrate is provided on the display substrate, and the first floating electrode is provided between the touch electrode and the display substrate, and since the first floating electrode and the touch electrode at least partially overlap in the thickness direction of the touch insulating layer, an overlap area of the touch electrode and the display electrode of the display substrate in the thickness direction of the touch substrate is reduced, so as to reduce coupling capacitance between the display electrode and the touch electrode, thereby improving signal-to-noise ratio; and at the same time, because the coupling capacitance is reduced, loads of the touch electrode and the display electrode are also reduced.

DESCRIPTION OF REFERENCE NUMERALS

1—touch insulating layer; 2—touch electrode; 21—first electrode strip; 211—first protrusion; 212—first concave part; 22—second electrode strip; 221—extension part; 222—second protrusion; 223—second concave part; 224—electrode segment; 3—first floating electrode; 31—first grid hole; 4—touch protective layer; 5—bridging electrode; 51—bridging region; 6—buffer layer; 7—encapsulation layer; 8—light emitter; 9—substrate; 10—second floating electrode; 100—first touch electrode; 200—second touch electrode.

DETAILED DESCRIPTION

Description will now be made in detail to exemplary embodiments, examples of which are shown in the accompanying drawings. When the following description refers to the drawings, unless otherwise indicated, the same numbers in different drawings indicate the same or similar elements. Embodiments described in the following exemplary embodiments do not represent all embodiments consistent with the present disclosure. In contrary, they are merely examples of apparatuses consistent with some aspects of the present disclosure as described in detail in the appended claims.

The terms used in the present disclosure are for the purpose of describing specific embodiments only and are not intended to limit the present disclosure. Unless otherwise defined, technical terms or scientific terms used in the present disclosure shall have their ordinary meanings as understood by those of ordinary skills in the field to which the present disclosure belongs. The "first", "second" and similar words used in the specification and claims of the present disclosure do not indicate any order, quantity or importance, but are only used to distinguish different components. Similarly, similar words such as "a" or "an" do not mean quantity limitation, but mean that there is at least one. "Multiple" or "a plurality of" means two or more. Unless otherwise specified, similar words such as "front", "rear", "lower" and/or "upper" are only for convenience of explanation, and are not limited to a position or a spatial orientation. Similar words such as "include" or "comprise" mean that the elements or objects appear before "include" or "comprise" cover the elements or objects listed after "include" or "comprise" and their equivalents, but do not exclude other elements or objects. Similar words such as "connect" or "couple" are not limited to physical or mechanical connection, but may include electrical connection, whether direct or indirect. Singular forms "a", "the" and "said" used in the specification of the present disclosure and the appended claims are also intended to include plural forms, unless the context clearly indicates other meaning. It should also be understood that the term "and/or" as used herein refers to and includes any or all possible combinations of one or more associated listed items.

In related arts, a display panel includes a touch substrate and a display substrate. The touch substrate includes a touch electrode. The display substrate includes a display electrode. The display electrode may be a display cathode or a display anode. Coupling capacitance between the display electrode and the touch electrode is large, which leads to poor signal-to-noise ratio of the touch substrate.

An embodiment of the present disclosure provides a touch substrate. The touch substrate may include a touch insulating layer 1, a touch electrode 2 and a first floating electrode 3. The touch electrode 2 is provided at a side of the touch insulating layer 1. The first floating electrode 3 is provided at a side of the touch insulating layer 1 away from the touch electrode 2, where the first floating electrode 3 and the touch electrode 2 at least partially overlap in a thickness direction of the touch insulating layer 1.

According to the touch substrate of the embodiment of the present disclosure, during use, the touch substrate is provided on the display substrate, and the first floating electrode 3 is provided between the touch electrode 2 and the display substrate. Since the first floating electrode 3 and the touch electrode 2 at least partially overlap in the thickness direction of the touch insulating layer 1, an overlap area of the touch electrode 2 and the display electrode of the display substrate in the thickness direction of the touch substrate is reduced, so as to reduce coupling capacitance between the display electrode and the touch electrode 2, thereby improving signal-to-noise ratio. At the same time, because the coupling capacitance is reduced, loads of the touch electrode 2 and the display electrode are also reduced.

In the following, respective parts of the touch substrate of the embodiment of the present disclosure will be described in detail.

Figure 2:
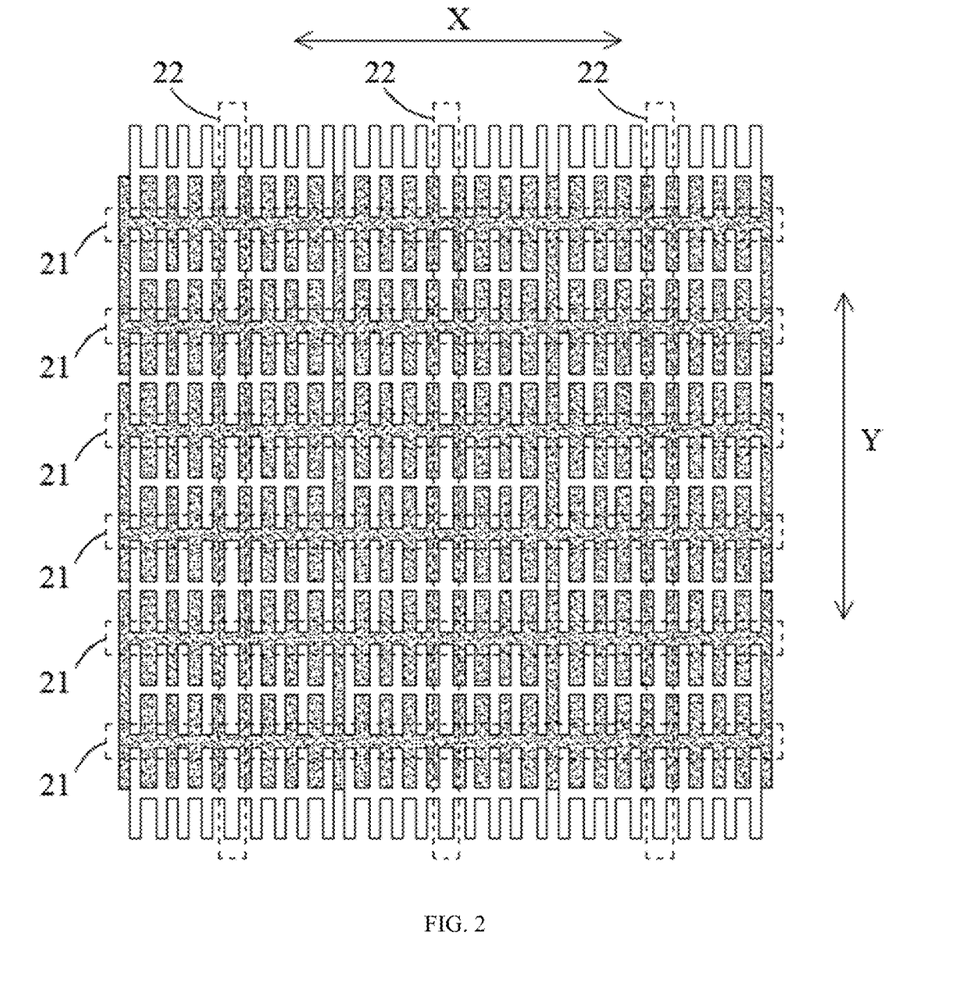
FIG. 2 is a schematic diagram of a touch electrode according to an embodiment of the present disclosure.

As shown in FIG. 2, the touch electrode may include a first touch electrode 100 and a second touch electrode 200. The first touch electrode 100 includes one or more first electrode strips 21. The second touch electrode 200 includes one or more second electrode strips 22. The number of the first electrode strip 21 may be plural, and the first electrode strip 21 extends along a first direction (i.e., X direction shown in FIG. 2), that is, a plurality of first electrode strips 21 are arranged in parallel. The number of the second electrode strip 22 may be plural, and the second electrode strip 22 extends along a second direction (i.e., Y direction shown in FIG. 2), that is, a plurality of second electrode strips 22 are arranged in parallel. The first electrode strip 21 and the second electrode strip 22 are arranged in a cross manner, that is, the first direction and the second direction are different. For example, the first direction may be perpendicular to the second direction. One of the first electrode strip 21 and the second electrode strip 22 is a touch-driven electrode strip, and the other is a touch-sensing electrode strip. In addition, the first electrode strip 21 and the second electrode strip 22 may each have a grid shape, where the grid shape may be a grid shape including rectangles, a grid shape including hexagons, a grid shape including triangles, a grid shape including diamonds, etc.

Figure 3:
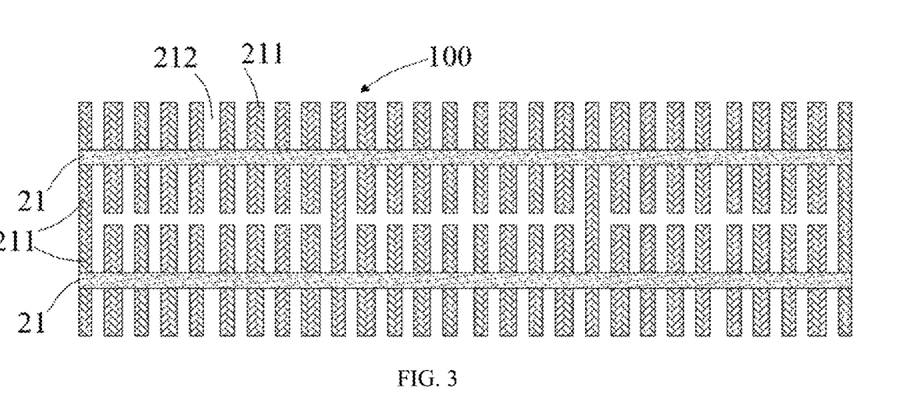
FIG. 3 is a schematic diagram of a first touch electrode according to an embodiment of the present disclosure.

As shown in FIG. 3, the first electrode strip 21 may be provided with, in a width direction of the first electrode strip 21, a plurality of first protrusions 211 spaced, and a first concave part 212 is formed between every two adjacent first protrusions 211. The width direction of the first electrode strip 21 may be the second direction. The first electrode strip 21 may be provided with, at at least one side of the width direction of the first electrode strip 21, a plurality of first protrusions 211 spaced. The number of the first protrusions 211 provided at a side of the first electrode strip 21 and the number of the first protrusions 211 provided at the other side of the first electrode strip 21 may be the same, and certainly may also be different. The first protrusions 211 may have a strip structure, and extend along the second direction. A width of the first protrusion 211 with the strip structure may be equal to a width of the first concave part 212, and certainly, the width of the first protrusion 211 with the strip structure may be smaller than the width of the first concave part 212. There exist two adjacent first electrode strips 21 electrically connected to each other in the plurality of first electrode strips 21, and specifically, for the two adjacent first electrode strips 21 electrically connected to each other, a first protrusion 211 of one first electrode strip 21 contacts with a first protrusion 211 of the other first electrode strip 21, to cause the two first electrode strips 21 electrically connected to each other. The width of the first electrode strip 21 and/or the width of the first protrusion 211 may be equal to a width of 1-10 grids, for example, a width of 2 grids, a width of 3 grids, a width of 4 grids, a width of 5 grids, a width of 6 grids, a width of 7 grids, a width of 8 grids, a width of 9 grids, etc.

Figure 5:
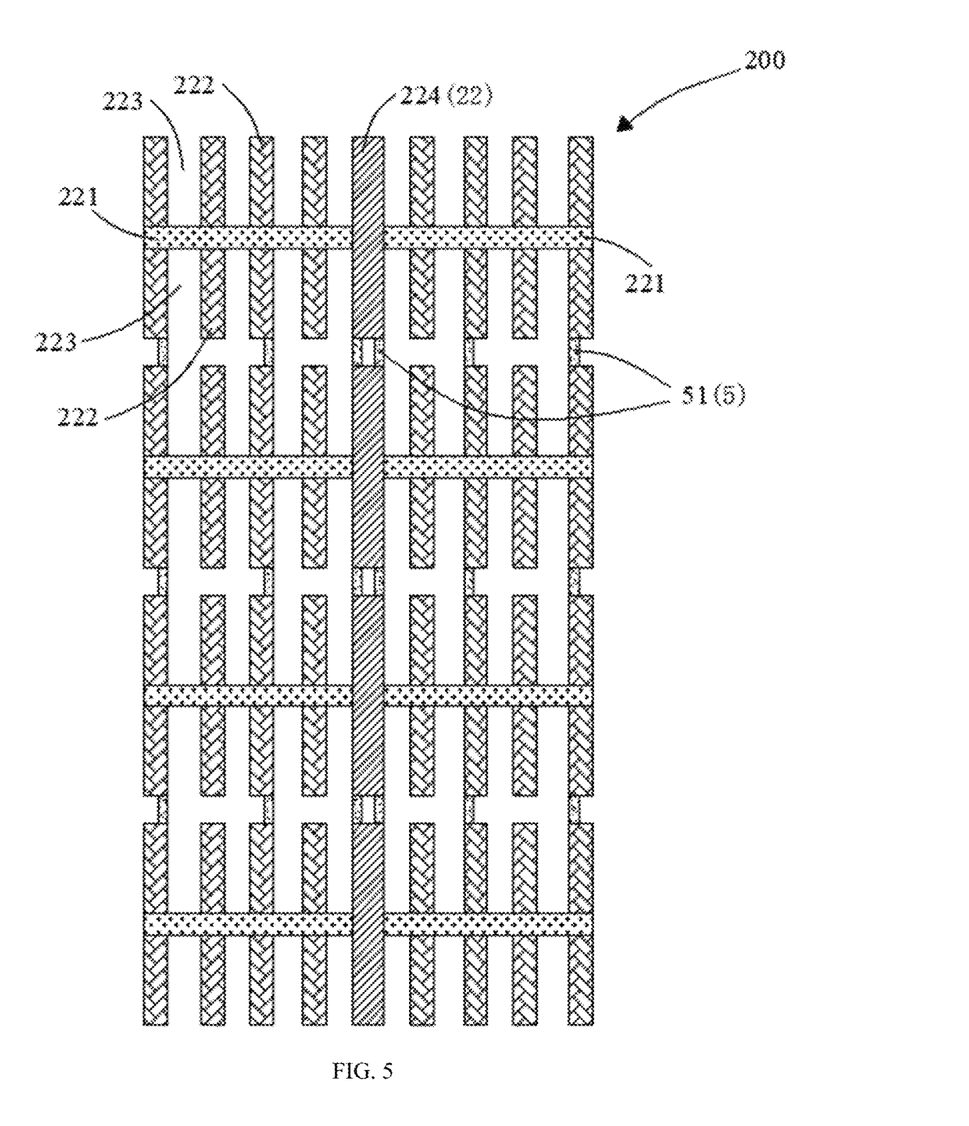
FIG. 5 is a schematic diagram of a second touch electrode according to an embodiment of the present disclosure.

As shown in FIG. 5, in the second direction, the second electrode strip 22 includes a plurality of electrode segments 224 spaced. A cross region of the second electrode strip 22 and the first electrode strip 21 is an interval region of two adjacent electrode segments 224. The second electrode strip 22 may be provided with, in a width direction of the second electrode strip 22, one or more extension parts 221. The width direction of the second electrode strip 22 may be the first direction. The extension part 221 may extend along the first direction. Specifically, for each electrode segment 224, the electrode segment is provided with, in a width direction of the electrode segment 224, two extension parts 221, the two extension parts 221 may be located at two sides of the electrode segment 224, and the two extension parts 221 may be aligned in the first direction.

As shown in FIG. 5, the extension part 221 may be provided with, in the width direction of the extension part 221, second protrusions 222. The width direction of the extension part 221 may be the second direction. The number of the second protrusions 222 may be plural, which are provided in a spacing. A second concave part 223 may be formed between every two adjacent second protrusions 222. The extension part 221 may be provided with, at at least one side of the width direction of the extension part 221, a plurality of second protrusions 222 spaced. The number of the second protrusions 222 provided at a side of the extension part 221 and the number of the second protrusions 222 provided at the other side of the extension part 221 may be the same, and certainly may be different. The second protrusion 222 may have a strip structure, and extend along the second direction. The second protrusions 222 may respectively extend into the first concave parts 212, and the first protrusions 211 may respectively extend into the second concave parts 223. The width of the second electrode strip 22, the width of the extension part 221 or the width of the second protrusion 222 may be equal to a width of 1-10 grids, for example, a width of 2 grids, a width of 3 grids, a width of 4 grids, a width of 5 grids, a width of 6 grids, a width of 7 grids, a width of 8 grids, a width of 9 grids, etc.

Figure 1:
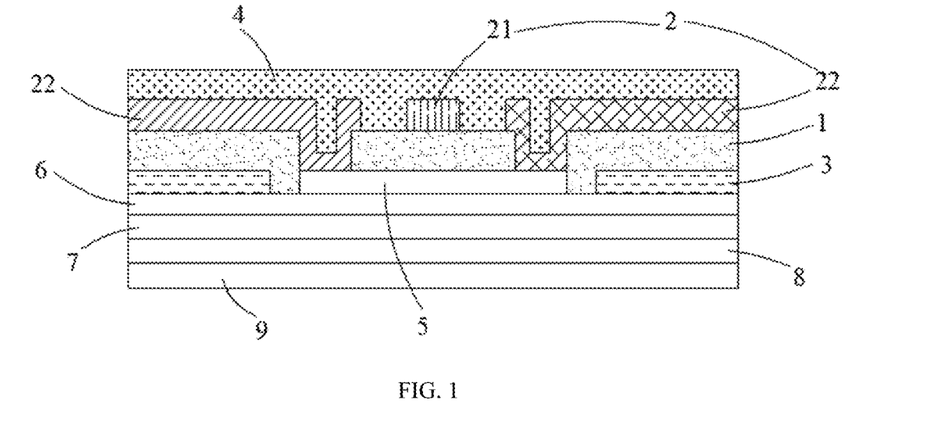
FIG. 1 is a schematic diagram of a display panel according to an embodiment of the present disclosure.
Figure 7:
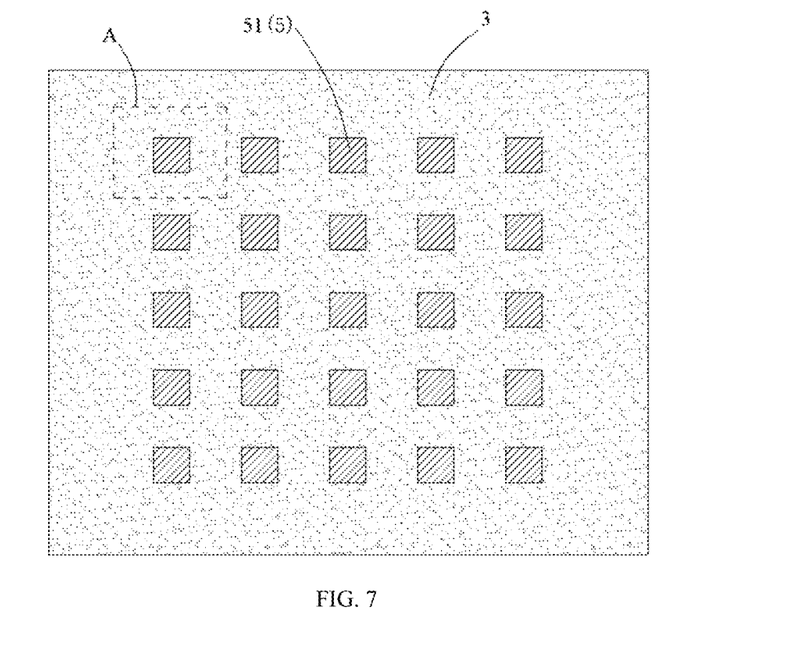
FIG. 7 is a schematic diagram of a first floating electrode and a bridging electrode according to an embodiment of the present disclosure.
Figure 8:
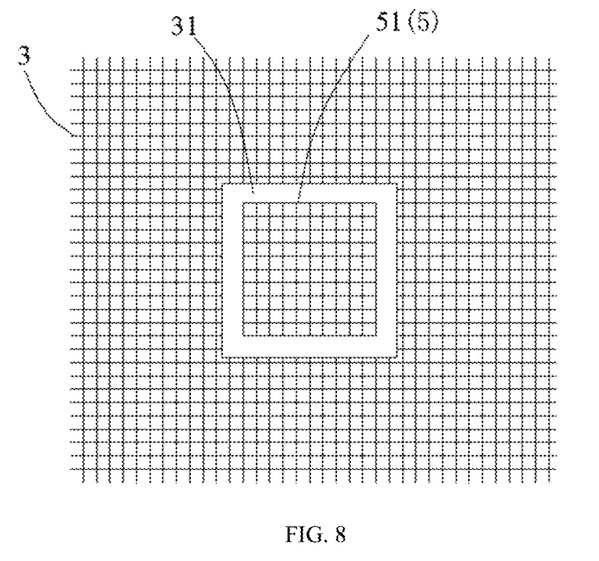
FIG. 8 is an enlarged schematic diagram of part A of the structure shown in FIG. 7.

As shown in FIG. 1, FIG. 7 and FIG. 8, the touch substrate may further include a bridging electrode 5. The bridging electrode 5 may have a grid shape, where the grid shape may be a grid shape including rectangles, a grid shape including hexagons, a grid shape including triangles, a grid shape including diamonds, etc. The number of the bridging electrode 5 may be plural, which are provided in a spacing. The bridging electrode 5 may be provided at a side of the touch insulating layer 1 away from the touch electrode 2. One of the first electrode strip 21 and the second electrode strip 22 is connected to the bridging electrode 5. For example, the second electrode strip 22 is connected to the bridging electrode 5, and specifically, as shown in FIG. 5, two adjacent electrode segments 224 in the plurality of electrode segments 224 provided in a spacing are connected through the bridging electrode 5. The bridging electrode 5 may include a plurality of bridging regions 51 provided in a spacing. The plurality of bridging regions 51 provided in a spacing may be provided in an insulating manner, but it is not limited by the present disclosure. The two adjacent electrode segments 224 are connected through a bridging region 51. In addition, for two adjacent extension parts 221, a second protrusion 222 of one extension part 221 may be connected to a second protrusion 222 of the other extension part 221 through another bridging region 51.

As shown in FIG. 1, the first floating electrode 3 is provided at a side of the touch insulating layer 1 away from the touch electrode 2, where the first floating electrode 3 and the touch electrode 2 at least partially overlap in a thickness direction of the touch insulating layer 1, so as to reduce an overlap area of the touch electrode 2 and the display electrode, thereby reducing coupling capacitance of the touch electrode 2 and the display electrode. As shown in FIG. 7 and FIG. 8, the first floating electrode 3 may have a grid shape. The first floating electrode 3 may be provided at a same layer with the bridging electrode 5. The first floating electrode 3 may be provided with a first gird hole 31, and the bridging electrode 5 may be located within the first gird hole 31. It is taken as an example that the bridging electrode 5 includes a plurality of bridging regions 51 spaced, and the number of the first gird hole 31 may be plural, and the plurality of bridging regions 51 are provided in the plurality of first gird holes 31 one-to-one. The first floating electrode 3 may include a plurality of electrode regions. The plurality of electrode regions may be provided in an insulating manner, and certainly, the plurality of electrode regions may also be electrically connected. Compared with the plurality of electrode regions electrically connected, the plurality of electrode regions provided in the insulating manner can further reduce influence of the display electrode on the touch electrode 2. In addition, the first floating electrode 3 may also be referred to as a first floating-arranged electrode or a first air-float electrode, that is, the first floating electrode 3 has an island electrode design, which is not grounded or is not connected to a fixed power signal.

Figure 4:
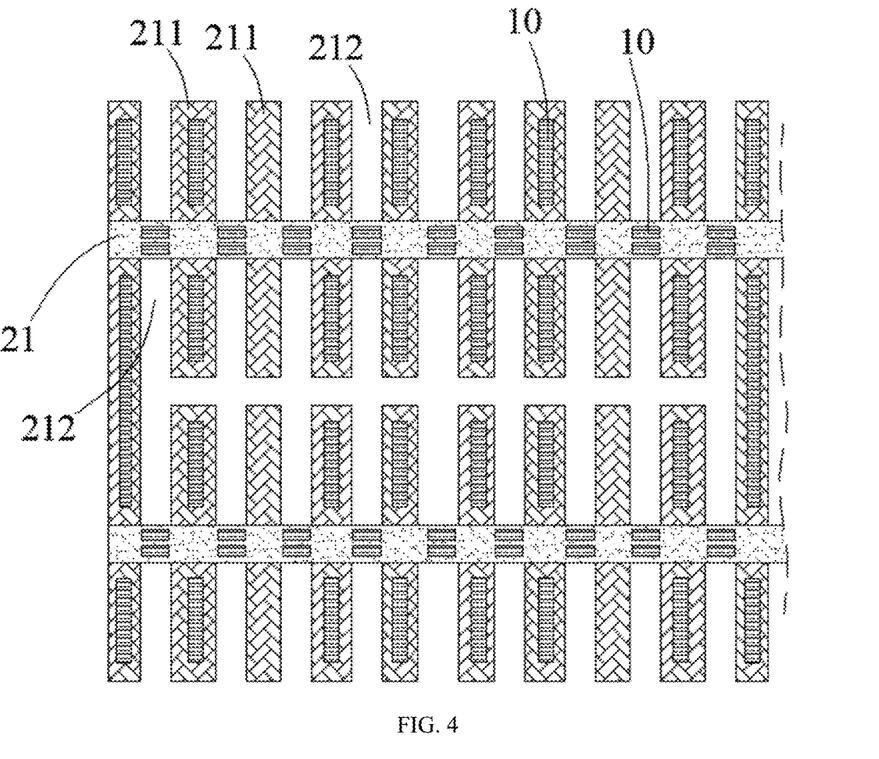
FIG. 4 is a partial schematic diagram of a first touch electrode according to an embodiment of the present disclosure.
Figure 6:
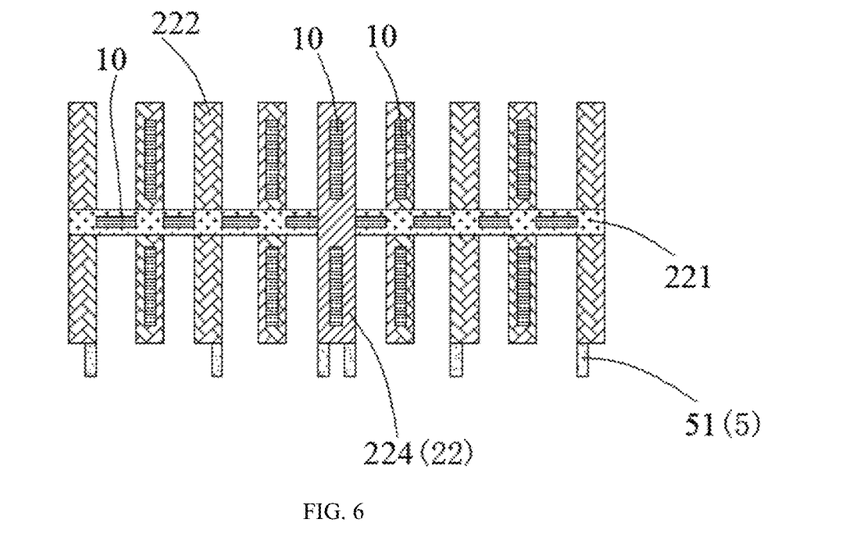
FIG. 6 is a partial schematic diagram of a second touch electrode according to an embodiment of the present disclosure.
Figure 9:
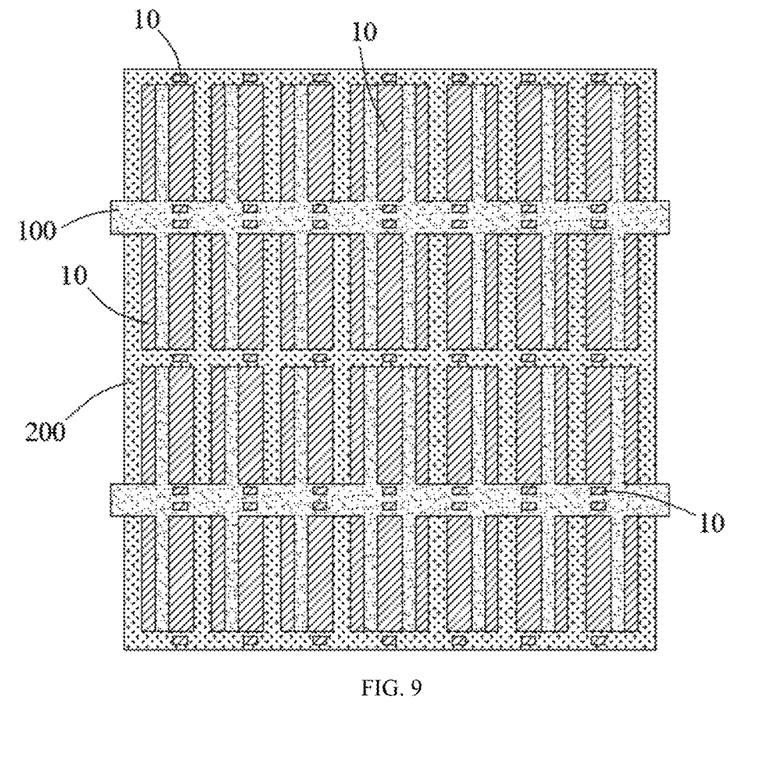
FIG. 9 is another schematic diagram of the touch electrode according to an embodiment of the present disclosure.

As shown in FIG. 4, FIG. 6 and FIG. 9, the touch substrate of the embodiment of the present disclosure may further include a second floating electrode 10. The second floating electrode 10 may be provided at a side of the touch insulating layer 1 away from the first floating electrode 3. The touch electrode 2 with the grid shape may be provided with a second gird hole, and the second floating electrode 10 may be located at the second gird hole. The first electrode strip 21 may be provided with the second gird hole. The first protrusion 211 may be provided with the second gird hole. The second electrode strip 22 may be provided with the second gird hole. The extension part 221 may be provided with the second gird hole. The second protrusion 222 may be provided with the second gird hole. In other embodiments of the present disclosure, as shown in FIG. 9, an interval area between the first touch electrode 100 and the second touch electrode 200 may also be provided with the second gird hole. In addition, the second floating electrodes 10 may have a grid shape. As shown in FIG. 9, the first touch electrode 100 extends along the first direction, and is connected to the second touch electrode 200 in the second direction through the bridging electrode 5. In addition, the second floating electrode 10 may also be referred to as a second floating-arranged electrode or a second air-float electrode, that is, the second floating electrode 10 has an island electrode design, which is not grounded or is not connected to a fixed power signal.

As shown in FIG. 1, the touch substrate of the embodiment of the present disclosure may further include a buffer layer 6 and a touch protective layer 4. The buffer layer 6 may be located at a side of the touch insulating layer 1 away from the touch electrode 2, and the first floating electrode 3 and the bridging electrode 5 are located between the buffer layer 6 and the touch insulating layer 1. The touch protective layer 4 covers the touch insulating layer 1, the touch electrode 2 and the second floating electrode 10.

As shown in FIG. 1, embodiments of the present disclosure further provide a display panel. The display panel may include a display substrate and the touch substrate of any one of the above embodiments. The display substrate may include a substrate 9 and a light emitter 8. The substrate 9 may be a rigid substrate or, certainly, may be a soft substrate. The light emitter 8 may be provided at the substrate 9. A driving transistor may further be provided between the light emitter 8 and the substrate 9. The driving transistor may be a thin film transistor. The touch substrate may be provided at a side of the light emitter 8 away from the substrate 9. The light emitter 8 is an OLED (Organic Light-Emitting Diode) light emitter, a Micro LED (Light-Emitting Diode) light emitter, a Mini LED light emitter, a quantum dot light emitter or an LCD (Liquid Crystal Display) light emitter. The light emitter 8 may include a first display electrode and a second display electrode provided oppositely, and a light-emitting layer located between the first display electrode and the second display electrode. One of the first display electrode and the second display electrode is a display anode, and the other is a display cathode. The display substrate may further include an encapsulation layer 7. The encapsulation layer 7 may be provided at a side of the light emitter 8 away from the substrate 9. The encapsulation layer 7 may include a first inorganic encapsulation layer, an organic encapsulation layer and a second inorganic encapsulation layer. The first inorganic encapsulation layer and the second inorganic encapsulation layer are provided oppositely, and the organic encapsulation layer is provided between the first inorganic encapsulation layer and the second inorganic encapsulation layer. The touch substrate may be provided at a side of the encapsulation layer 7 away from the substrate 9. It is taken as an example that the touch substrate includes the buffer layer 6, and the buffer layer 6 is provided at a surface of the encapsulation layer 7 away from the substrate 9, and the touch insulating layer 1 may be located at a side of the buffer layer 6 away from the substrate 9. Since the touch substrate in the display panel of the embodiment of the present disclosure is the same as the touch substrate in the embodiment of the above-mentioned touch substrate, they have the same beneficial effects, and will not be repeated here.

Embodiments of the present disclosure further provide a display apparatus, where the display apparatus may include the display panel as mentioned in any one of the above embodiments. The display apparatus may be a mobile phone, and certainly, may also be a tablet computer, a television, a watch, etc. Since the display panel in the display apparatus of the embodiment of the present disclosure is the same as the display panel in the embodiment of the above-mentioned display panel, they have the same beneficial effects, and will not be repeated here.

The above are only preferred embodiments of the present disclosure, and they do not limit the present disclosure in any form. Although the present disclosure has been disclosed in the preferred embodiments, they are not used to limit the present disclosure. Those skilled in the art can make some changes or modifies into an equivalent embodiment by using the technical content disclosed above without departing from the scope of the technical solution of the present disclosure. So long as the content does not depart from the technical solution of the present disclosure, any simple changes, equivalent changes or modifications made to the above embodiments according to the technical essence of the present disclosure shall all belong to the scope of the technical solution of the present disclosure.

The invention claimed is:

1. A touch substrate, comprising:
   a touch insulating layer;
   a touch electrode at a side of the touch insulating layer; and
   a first floating electrode at a side of the touch insulating layer away from the touch electrode, wherein the first floating electrode and the touch electrode at least partially overlap in a thickness direction of the touch insulating layer;
   wherein the first floating electrode is not grounded or is not connected to a fixed power signal; and
   wherein the touch electrode comprises a first electrode strip and a second electrode strip arranged in a cross manner, the first electrode strip extends along a first direction, the second electrode strip extends along a second direction, and the first direction and the second direction are different;

first protrusions spaced are provided in a width direction of the first electrode strip, and a first concave part is formed between every two adjacent first protrusions of the first protrusions; an extension part is arranged in a width direction of the second electrode strip, and the extension part extends along the first direction, and second protrusions are provided in a width direction of the extension part, and the second protrusions extend into the first concave parts respectively.

2. The touch substrate according to claim 1, wherein the first floating electrode comprises a plurality of electrode regions arranged in an insulating manner.

3. The touch substrate according to claim 1, wherein the touch electrode comprises a first electrode strip and a second electrode strip arranged in a cross manner, and the touch substrate further comprises:

a bridging electrode at a side of the touch insulating layer away from the touch electrode, wherein one of the first electrode strip and the second electrode strip is connected to the bridging electrode, and the bridging electrode and the first floating electrode are in a same layer.

4. The touch substrate according to claim 3, wherein the first floating electrode has a grid shape, the first floating electrode comprises a first gird hole, and the bridging electrode is located in the first gird hole.

5. The touch substrate according to claim 1, wherein the first floating electrode has a grid shape.

6. The touch substrate according to claim 1, wherein extension parts spaced are provided at a side of the width direction of the second electrode strip; for two adjacent extension parts of the extension parts, a side of one of the two adjacent extension parts close to a side of another of the two adjacent extension parts is provided with a second protrusion; and the touch substrate further comprises: a bridging electrode at a side of the touch insulating layer away from the touch electrode; the second protrusion of the two adjacent extension parts is connected through the bridging electrode.

7. The touch substrate according to claim 6, wherein in the second direction, the second electrode strip comprises electrode segments spaced;

the bridging electrode comprises bridging regions spaced, the second protrusion of the two adjacent extension parts are connected through one of the bridging regions, and two adjacent electrode segments of the electrode segments are connected through another of the bridging regions.

8. The touch substrate according to claim 6, wherein the touch electrode has a grid shape, a width of the first electrode strip, a width of the second electrode strip, a width of the first protrusion, a width of the extension part or a width of the second protrusion is equal to a width of 1-10 grids.

9. The touch substrate according to claim 1, wherein the touch substrate further comprises a buffer layer and a touch protective layer, wherein the buffer layer is located at a side of the touch insulating layer away from the touch electrode, and the first floating electrode is located between the buffer layer and the touch insulating layer; and the touch protective layer covers the touch insulating layer and the touch electrode.

10. The touch substrate according to claim 1, wherein the touch electrode has a grid shape, the touch electrode is provided with a second grid hole, and the touch substrate further comprises:

a second floating electrode at a side of the touch insulating layer away from the first floating electrode, and located in the second grid hole.

11. The touch substrate according to claim 1, wherein the touch electrode has a grid shape, the first electrode strip and/or the first protrusion comprises a second grid hole, and the touch substrate further comprises: a second floating electrode at a side of the touch insulating layer away from the first floating electrode and located in the second grid hole.

12. The touch substrate according to claim 6, wherein the touch electrode has a grid shape, and at least one of the second electrode strip, the extension part or the second protrusion is/are provided with a second gird hole, and the touch substrate further comprises:

a second floating electrode at a side of the touch insulating layer away from the first floating electrode and located in the second gird hole.

13. The touch substrate according to claim 10, wherein the second floating electrode has a grid shape.

14. A display panel, comprising:

the touch substrate according to claim 1;

a display substrate, comprising a substrate and a light emitter, wherein the light emitter is provided on the substrate, and the touch substrate is provided at a side of the light emitter away from the substrate.

15. The display panel according to claim 14, wherein the light emitter comprises a first electrode and a second electrode provided oppositely, and a light-emitting layer located between the first electrode and the second electrode; the display substrate further comprises an encapsulation layer, wherein the encapsulation layer is provided at a side of the light emitter away from the substrate, and the touch substrate is provided at a surface of the encapsulation layer away from the substrate.

16. A display apparatus, comprising: the display panel according to claim 14.

* * * * *